(12) United States Patent
LaMaire et al.

(10) Patent No.: US 6,343,350 B1
(45) Date of Patent: Jan. 29, 2002

(54) CONSERVING STORAGE SPACE BY MEANS OF LOW RESOLUTION OBJECTS

(75) Inventors: Richard Orville LaMaire; John Timothy Robinson, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/023,793

(22) Filed: Feb. 13, 1998

(51) Int. Cl.$^7$ .............................................. G06F 12/00
(52) U.S. Cl. ...................... 711/156; 711/159; 711/171
(58) Field of Search ................................. 711/154, 171, 711/172, 156, 158, 159, 118, 133

(56) References Cited

U.S. PATENT DOCUMENTS 4,322,795 A * 3/1982 Lange et al. ................ 711/154
5,263,136 A * 11/1993 DeAguiar et al. .......... 711/154
5,623,701 A * 4/1997 Bakke et al. ............... 711/171

FOREIGN PATENT DOCUMENTS

JP  11-161571 A  6/1999
JP  11-219312 A  8/1999

OTHER PUBLICATIONS

J. Tsuji, et al., "Prototyping Of Mobile Proxy Server System," Information Technology R&D Center, Mitusubishi Electric Corporation, Shizuoka University, p. 67–72, Jul. 25, 1997.

A. Ortega et al., "Soft Caching:Web Cache Management Techniques for Images", IEEE Signal Processing Society 1997 Workshop on Multimedia Signal Processing, Jun. 23–25, 1997, Princeton, NJ, Electronic Proceedings.

B. Noble, et al., "A Programming Interface for Application–Aware Adaptation in Mobil Computing", 1995 Mobile and Location–Independent Computing Symposium (USENIX), p. 57–66.

* cited by examiner

*Primary Examiner*—Matthew Kim
*Assistant Examiner*—C. P. Chace
(74) *Attorney, Agent, or Firm*—Louis P. Herzberg

(57) ABSTRACT

The memory space (often in the form of cache) in a system (e.g., an Internet proxy or web browser) is conserved by saving low resolution versions of data objects when the full resolution version is removed (e.g., due to age, using a least recently used (LRU) replacement policy) in order to create space for new objects. This provides for efficient use of the memory space. In many situations, the low resolution version of the data object is of adequate quality for usage. Further, even when this is not the case, it can be useful to quickly obtain a low resolution version and then with some delay, obtain the full resolution version at the user or application's request. Particular advantageous embodiments of methods, apparatus and article of manufacture implementing the invention are presented.

45 Claims, 12 Drawing Sheets

| Number Of Types (Three) | | |
|---|---|---|
| Type Name 1 | Resolution Reduction Procedure 1 | 820 |
| Type Name 2 | Resolution Reduction Procedure 2 | 830 |
| Type Name 3 | Resolution Reduction Procedure 3 | 840 |

(810 label points to the header row)

Fig. 8

CONSERVING STORAGE SPACE BY MEANS OF LOW RESOLUTION OBJECTS

FIELD OF THE INVENTION

The present invention is directed to storage memory in a data processing system and/or a network of computers. More particularly, the invention is directed to methods and apparatus for making replacement decisions for data objects in such a system and/or network.

BACKGROUND OF THE INVENTION

The conservation and efficient utilization of memory space are important for storage units. Although space is a significant consideration for general memory, it is most critical in space limited temporary, short or long term memory buffers. For example, in many data processing systems there is provided between the working store of the central processing unit and the main store, a high speed memory unit which is commonly called a 'cache'. This unit enables relatively fast access to a subset of data that was previously transferred from main storage to the cache. The main storage is usually either slower speed memory or hard disk storage. This improves the speed of operation of the data processing system. Similarly, in a network of computers caches are used to provide relatively fast access to data that was previously transferred from a distant networked computer. The distant network computer is generally an intermediate proxy computer or an originating web server computer. The Internet is such a network of computers.

To enable retrieval of information from the cache, a 'directory' of cache entries is maintained. Each data object residing in the cache has its address stored in the directory. Once the cache is filled-up, new data objects can only be entered if one or more old data objects are removed or, as is the subject of this invention, one or more old data objects are reduced in size. Certain procedures are necessary to select objects as candidates for replacement, and to update the directory after a change of cache contents.

A number of systems are known in the art that use cache stores and provide a mechanism for replacement selection and directory updating. For example, U.S. Pat. No. 4,322, 795 to R. E. Lange et al., discloses a cache memory arrangement using a least recently used (LRU) scheme for selecting a cache location in which to store data fetched from main memory upon a cache miss.

Several methods are known for finding objects to replace. This includes, for example, the methods given in a paper by Aggarwal et al, entitled, "On Caching Policies for Web Objects," IBM Research Report 20619, November 1996 (revised March 1997), which is herein incorporated by reference in its entirety. These methods provide alternative ways for choosing which data object or objects to remove instead of replacing the least recently used object. In particular, some of these methods consider factors such as object size in making the choice of objects to replace.

U.S. Pat. No. 5,043,885 to J. Robinson, also discloses a method for making non-LRU replacement choices based on reference counts that are maintained in specific ways. It is herein incorporated by reference.

None of these methods refers to or makes use of multiple resolution versions of a single object. Indeed, these alternative methods of finding objects to replace can be incorporated into an embodiment of the current invention, as subsequently presented, in straightforward ways.

SUMMARY OF THE INVENTION

The present invention is for a method, apparatus and article of manufacture for conserving memory space. A method provides for dynamically reducing the resolution of a multiresolution object. It provides mechanisms for reintegrating a dynamically reduced object back into the ordered-list of candidate replaceable objects and for managing multiple resolution levels of the same object. Also provided are procedures through which one computer can request a given resolution level of an object from another computer.

In an embodiment of the present invention a data object is being retrieved over a communication network, usually with some delay, and stored at an intermediate memory either in a proxy or a web browser or both. When the data object is first retrieved, a low resolution version of the object that does not previously exist is computed and saved with the high resolution version. In some cases, this is accomplished with very little additional work. Alternatively, a low resolution version of the object is computed prior to the deletion of a previously stored full resolution version. This last method is particularly useful in situations in which the data conversion is computationally inexpensive. Typically, a low resolution version would require an order of magnitude less storage space than the full resolution version.

In an apparatus implementing this method, when a memory hit is made to a low resolution version of a data object, the low resolution nature of the data object can be identified to the user or application by various means. For example, in a web browsing context in which an image is represented in low resolution format, graphical indicators like a special enclosing box is used. A user then performs a mouse click to retrieve the full resolution version. In other contexts, the data is explicitly labelled as a lower resolution version along with the degree of degradation.

The present invention also includes features applicable for storage on an article of manufacture. For example, the article may take the form of one or more floppy disks insertable into a computer. This will provide the system in which it is used with the attributes of the present invention.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 8 is an example of a table for determining whether an object is of a multiresolution type and if so what resolution reduction procedure to use in accordance with the present invention.

DESCRIPTION OF THE INVENTION

The present invention is a method, apparatus and article of manufacture for conserving memory space that is applicable to data objects that can be reduced in resolution. This method allows the effective memory size to be greatly increased as described in the embodiments described subsequently. The invention is generally applicable for temporary, short or long term storage applications. In one example of the invention, we consider a scenario in which a data object is being retrieved from a world wide web server over a communication network and is stored at caches both in an intermediate proxy and a client web browser. We henceforth refer to such data objects as network objects or objects.

Figure 1:
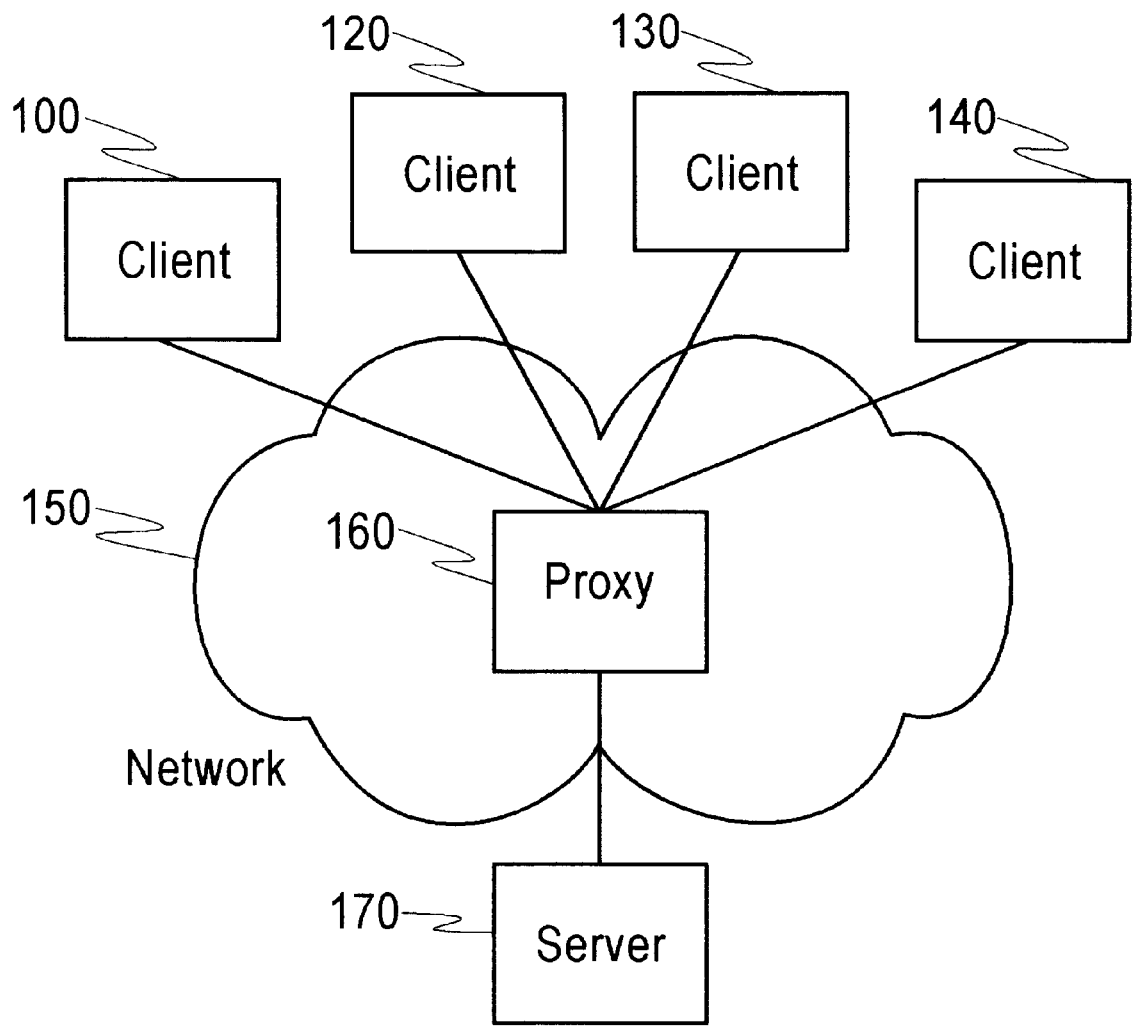
FIG. 1 is an example showing an interconnection scenario of client, proxy, and server computers wherein the present invention is implemented in each of these computers.

In the system of FIG. 1, a client computer 100 is connected to a second computer, the proxy 160, which communicates in turn to a third computer, the web server 170. In a typical client server exchange, the web browser application running on the client computer 100 makes a request for some network object from the web server 170 via the proxy 160. In response to the client's request, the web server 170 sends the network object to the proxy 160 which in turn sends it to the client computer 100. In this scenario, caches are present in the client and proxy and in some cases, also in the server.

Figure 2A:
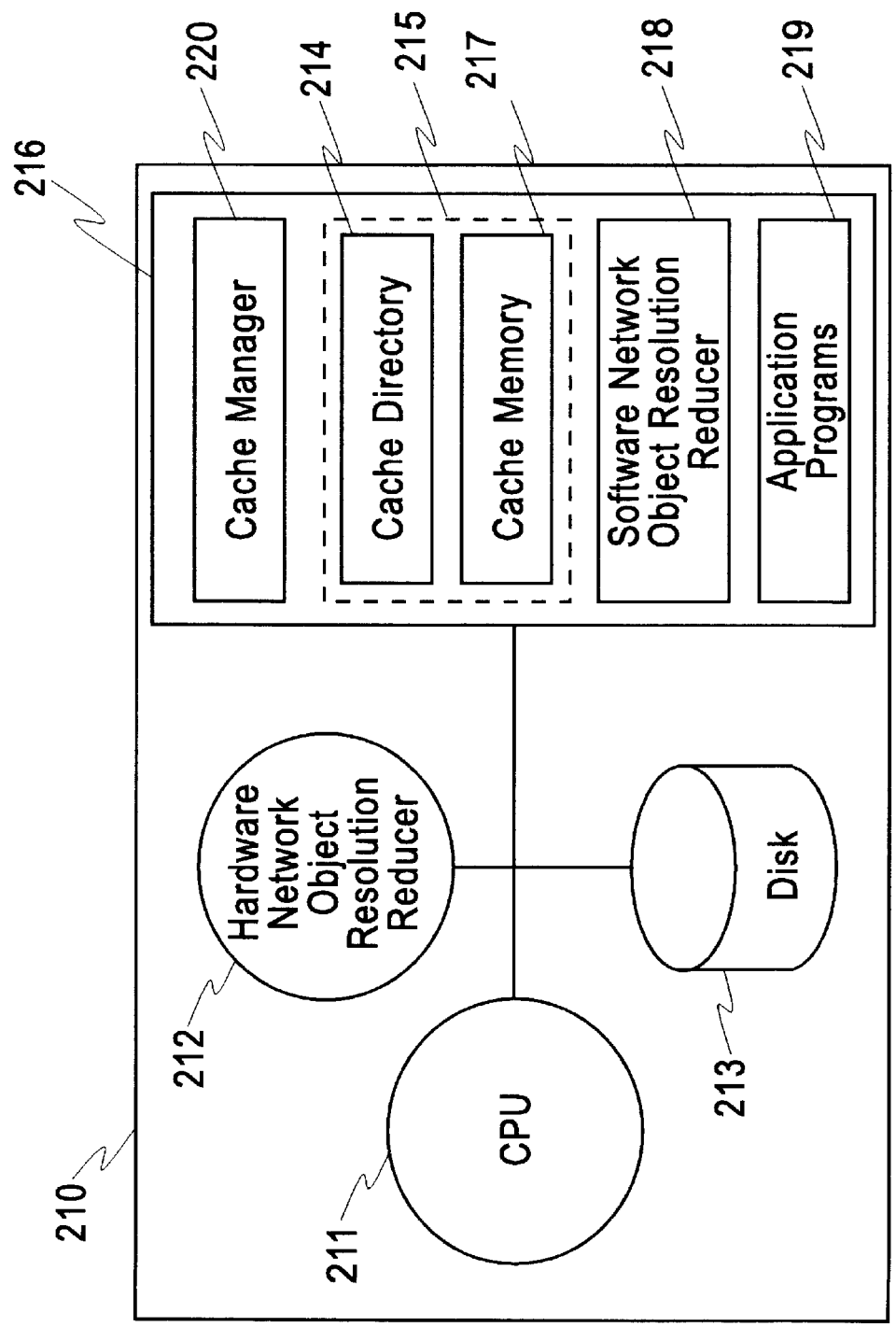
FIG. 2A is a block diagram showing an example of the components within the server, proxy and client computers shown in FIG. 1.

The hardware and software structure of the server, proxy, and client computers are generally similar. As shown in FIG. 2A, in addition to standard computer system components, such as the central processing unit (CPU) 211, and hard disk storage 213, a specific hardware component 212 for reducing the resolution of a network object is generally included. Such hardware units are used for very processing-intensive resolution reduction procedures, such as for the decoding and reduced resolution reencoding of video data. The cache related software components shown to be stored in the main memory 216 include the cache directory 214 and the cache memory 217 that together comprise the network object cache 215. The cache manager 220 updates the cache directory 214 and uses the information in the cache directory to store, access, and remove network objects in the cache memory 217. In addition to these components, software network object resolution reduction procedures 218 are also stored in memory. Resolution reduction procedures that are not highly data intensive, such as text truncation and most 'types' of image reduction are more typically implemented in software. Another software component of the system is the set of external application programs 219. For the proxy system, these programs may include mechanisms that automatically reduce the resolution of network objects as they pass through the proxy so as to conserve communication bandwidth on the link between the proxy and the client. This is the case when the client is connected via a wireless network. For the client system, the application programs typically include a web browser with which the user requests and views network objects.

For purposes of this invention, the term 'multiresolution object' refers to an object which is capable of being represented in a lower resolution (using less memory space) than the resolution in which it is presently represented. This is generally dependent upon a proviso that the system in which it is being employed has a means for forming or obtaining the lower resolution. A multiresolution object is said to be of a multiresolution type. Examples of multiresolution data 'types' and some examples of resolution reduction methods are described. As used herein it is assumed that a lower resolution version of an object requires less storage space than a higher resolution version of that object.

Unformatted text objects are reduced by various degrees of truncation. Structured text objects, such as HTML, are reduced by removing structural components. For example, the abstract component of a structured text object is used as a reduced resolution version of the object. For images, resolution reduction is achieved by decoding and reencoding (i.e., transcoding) the images with fewer pixels, fewer colors, or any other methods for achieving fewer bits/pixel. Audio objects are reduced by transcoding to lower sampling rates or with coarse sample quantization. Video objects are reduced by dropping video frames or by completely reencoding the stream. Any combination of the above is used to best satisfy a particular application.

Figure 2B:
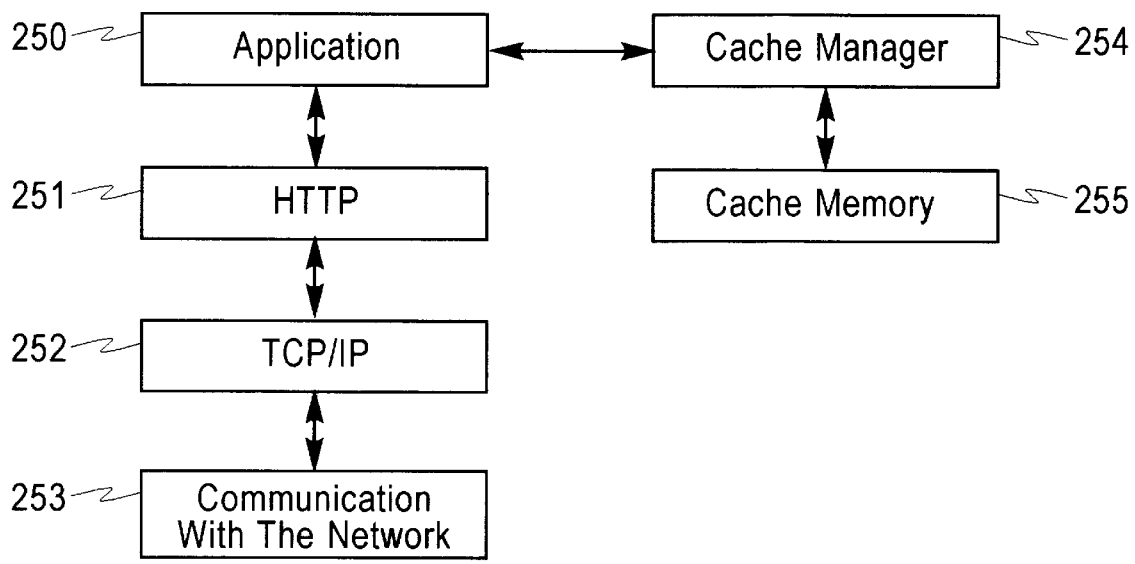
FIG. 2B is a block diagram showing an example of the layers of the networking communication stack and their interaction with the cache manager.

FIG. 2B shows the layers of the networking communication stack and their interaction with the cache manager. A network object cache can be present at the server, proxy, or client. As an illustration, and referring back to FIG. 1, a case is described in which the cache exists only at the proxy 160. Consider the case where a web browser on a client 100 makes a request for a particular network object. The network object is described by a Universal Resource Locator (URL) with which the browser (or proxy) can locate a web server 170 that has the requested data. To accomplish this, the client web browser uses the Hypertext Transfer Protocol (HTTP) with which it issues an HTTP GET request including the desired URL. The HTTP protocol is an application that uses the TCP/IP protocol for communication. The URL contains sufficient information to allow TCP/IP to obtain a destination address for a web server 170 with the requested data. This is accomplished in standard ways using the Domain Name System (DNS) protocol of the TCP/IP protocol suite. Since we are considering the architecture of FIG. 1 in which an intermediate proxy is included, the first step is for the client 100 web browser application to forward the aforementioned HTTP GET request to the proxy 160. It is noted that the TCP/IP address of the proxy is a parameter that is typically entered into the web browser by the user. The HTTP protocol then establishes a TCP connection to the proxy, issues the request, and when it arrives reads back the proxy's response. With reference to FIG. 2B, when the proxy application 250 receives the HTTP GET request from the HTTP protocol layer 251, which in turn has received it from the TCP/IP protocol suite 252, it forwards the given URL to the cache manager 254. This URL specifies a network object that the cache manager then searches for, in its cache directory 214. If the cache manager finds the requested data, it passes it back to the application 250, which wraps an HTTP header around the data and passes it back to the HTTP protocol layer as an HTTP RESPONSE that is sent to the client web browser through the various communication layers. If the cache manager does not find the requested data, then it informs the application 250, which sends an HTTP GET request to the server 170, but sets the source address to the proxy address so that the response is set back to the proxy. When the server 170 receives the HTTP GET request, it sends back an HTTP RESPONSE with the data or an error message. It is assumed here that the network object, not an error message, is returned. When the proxy application 250 receives this HTTP RESPONSE, it uses the cache manager 254 to store it in the cache memory 255, but the application 250 also sends an HTTP RESPONSE containing the data to the client 100 web browser.

Figure 3:
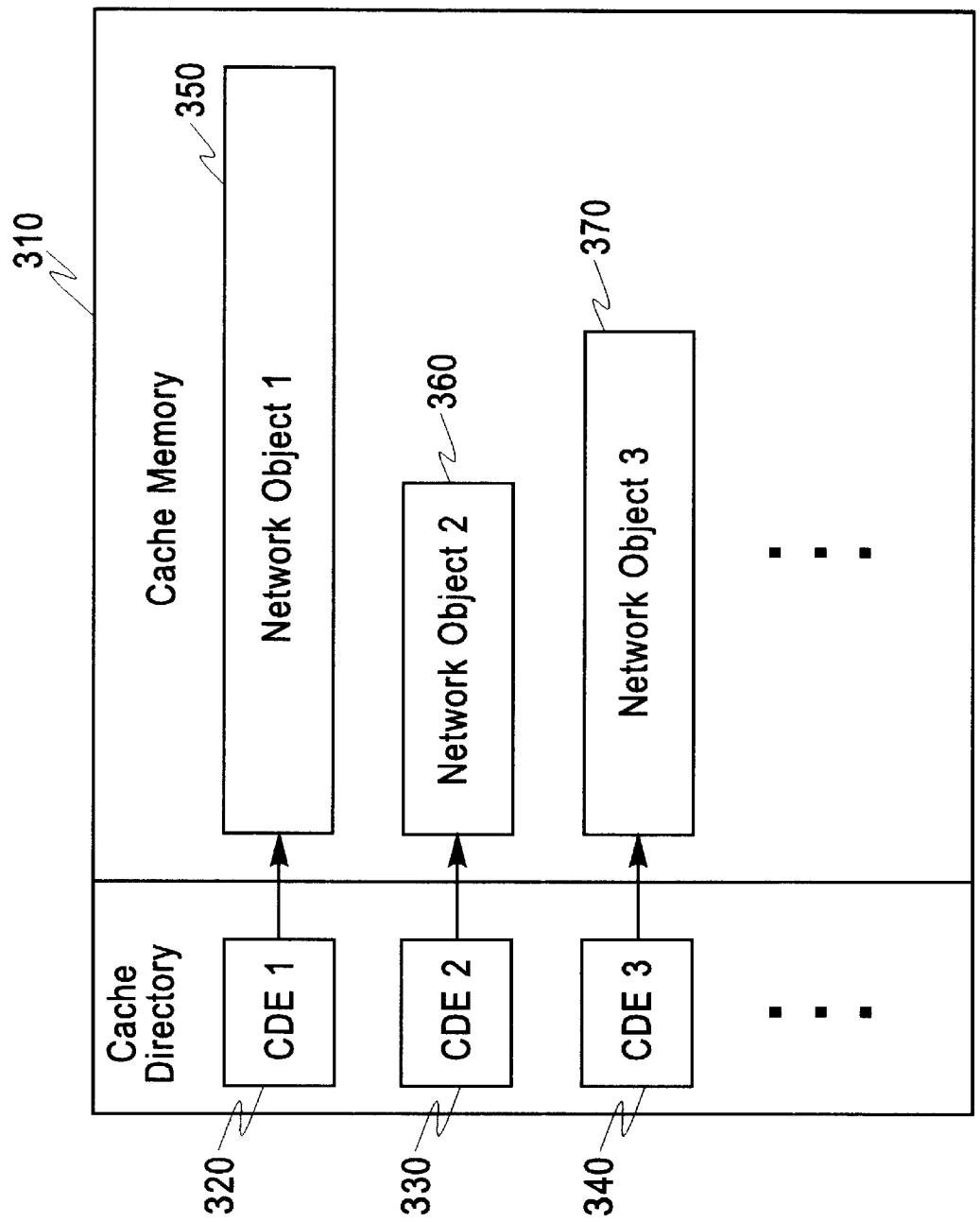
FIG. 3 shows an example of a network object cache typically realized by using the cache directory that has cache directory entries of the network objects with pointers to the locations in which the object are stored in the cache memory.

With reference to FIG. 3, a network object cache is typically realized by using the cache directory 300 that has cache directory entries (CDEs), 320, 330 or 340, of the network objects with pointers to the locations in which the objects are stored in the cache memory 310. The cache memory 310 is shown to include three network objects 350, 360 and 370.

Figure 4:
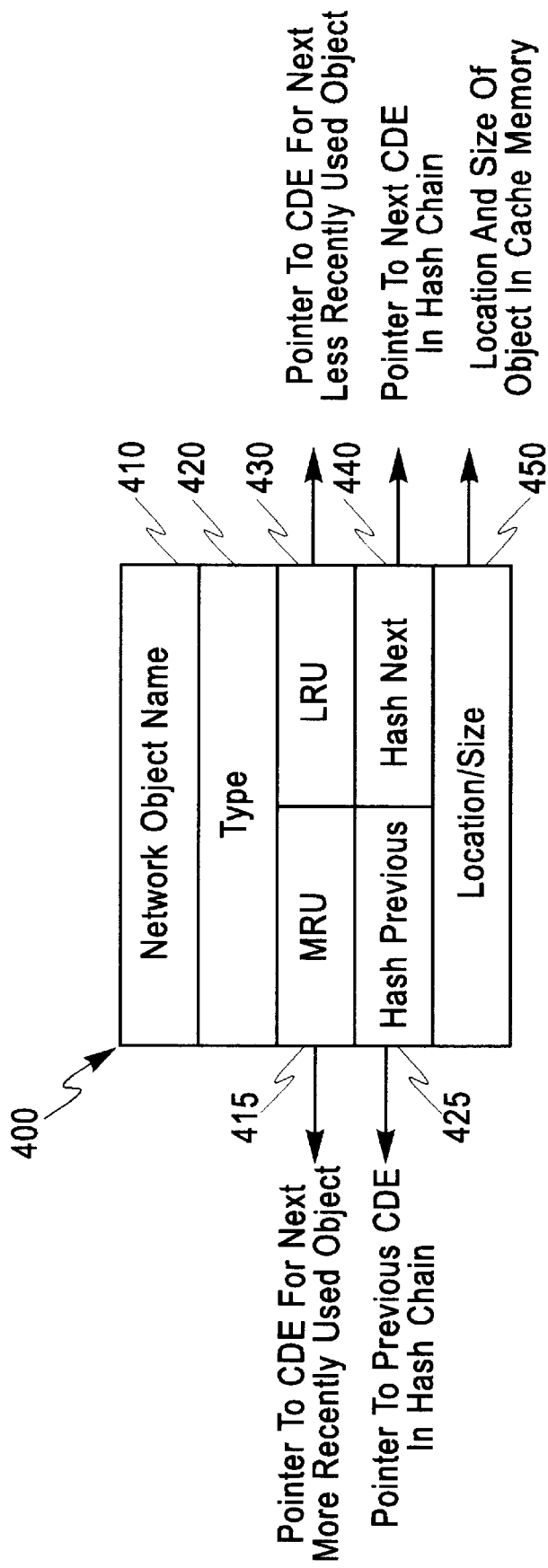
FIG. 4 is a detailed diagram of an example entry in the cache directory FIG. 3.

An example of a cache directory entry (CDE), which is used by the cache manager 254 for managing a network object cache, is shown in FIG. 4. It is noted that the CDE concept used as a part of the present invention is also usable for other applications. For the purposes of this example, it is assumed that a CDE is found by using a hash function applied to the network object name 410. It provides a pointer to the CDE 400 with the given hash value, and when necessary following an ordered list (such as a doubly-linked list, i.e. a hash chain) of CDEs (using fields 425, and 440) with the same hash value. This is continued until a CDE with the given network object name is found. Other methods for finding the CDE for an object with a given name are known in the art. These include, for example employing a linear scan of all CDES, a tree-structured index, etc. Any of these could be used as alternatives in an embodiment of the current invention subsequently described in straightforward ways.

Returning to FIG. 4, the full network object name is stored in CDE field 410, and the type of object (e.g. HTML, GIF, JPEG, etc.) is stored in CDE field 420. Next, the relative order in which objects in the cache have been accessed is stored using an doubly-linked list implementing a least-recently-used (LRU) chain. This is maintained by pointers (not shown) to the CDEs for the most-recently-used object and the least-recently-used object. Furthermore, to implement the doubly-linked list, each CDE has a field 415, which contains a pointer to the CDE for the next more-recently-used object, or a null if the CDE is for the overall most-recently-used object. It also contains a pointer (or a null) to the CDE 430 for the next less-recently-used object. Next the doubly-linked list of CDEs with the same hash value is implemented using field 440, which contains pointers to the previous or next CDE in the hash chain. Each pointer has a null if the CDE is the first or last in the hash chain. Finally, the location and size of the object in the cache is stored in field 450.

Figure 5:
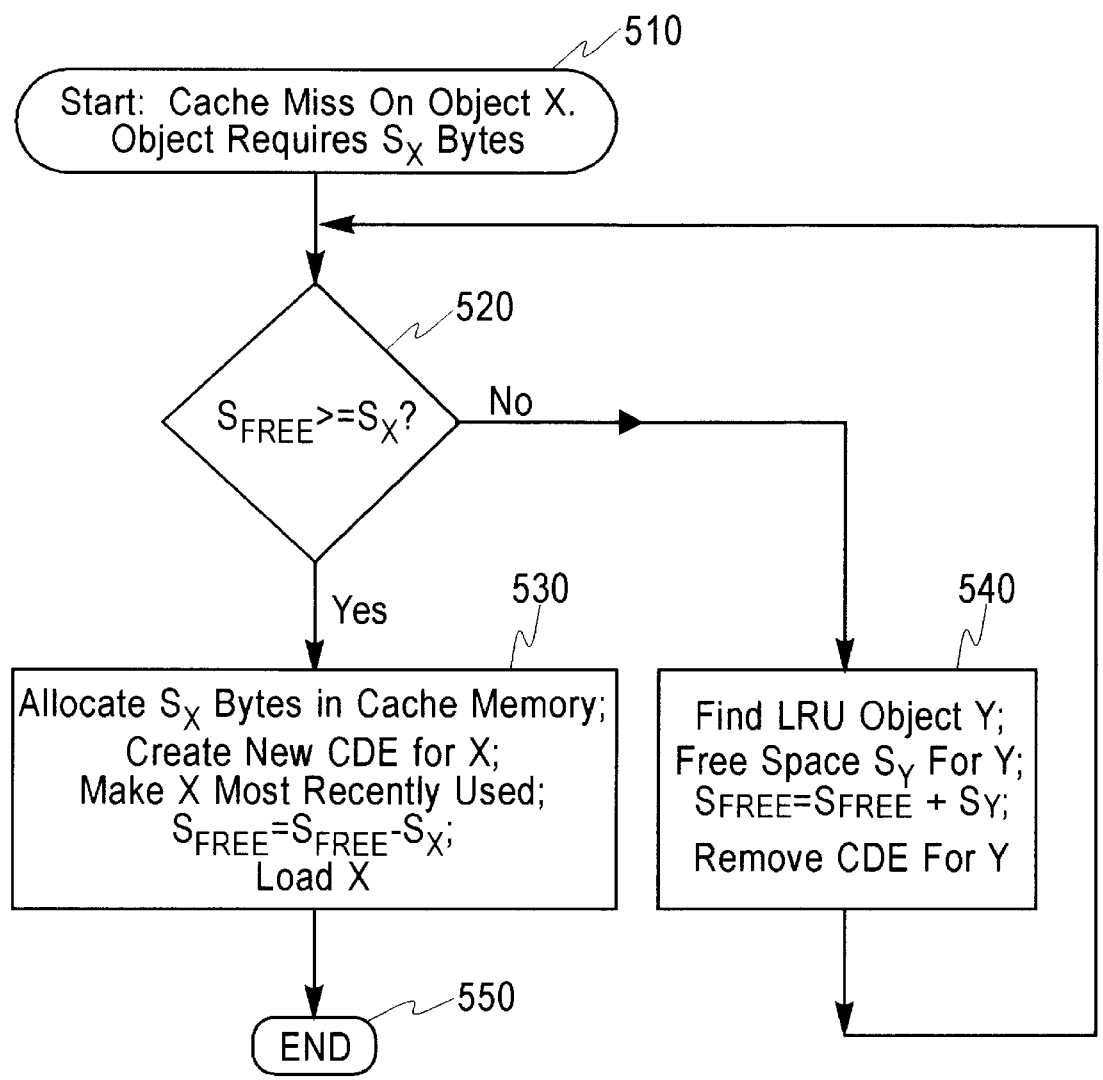
FIG. 5 is a flow chart showing an example of a method for removing objects from a network cache in order to create space to store a new network object.

An example of a method for removing objects in a network object cache in order to create space to store a new network object that is not currently in the cache, is shown in FIG. 5. In step 510, it is determined that object 'x' is not in the cache, and requires 'Sx' bytes of storage. In step 520 it is checked if the current free space in the cache, denoted by 'S_FREE', is greater than or equal to 'Sx'. If so, control proceeds to step 530, in which 'x' is stored in the cache. 'Sx' bytes of cache memory are allocated. A CDE for 'x' is created (linking the CDE in the hash chain). The CDE is set to be the most-recently-used. 'S_FREE' is set to 'S_FREE'–'Sx' and 'x' is loaded into the cache in the newly allocated memory area or areas. The method then terminates in step 550. If however in step 520 it was determined that there was insufficient free cache memory, control proceeds to step 540. In this step the least-recently-used object 'y' is found. The space allocated to this object consisting of 'Sy' bytes is made free. 'S_FREE' is increased to 'S_FREE'+'Sy'. The CDE for 'y' is removed since 'y' is no longer stored in the cache. Next, control returns to step 520, where again a check is made to determine if there is sufficient free cache memory to store x.

Many methods for finding objects to replace, are known to those skilled in the art. An example of a previous method that makes non-LRU replacement choices is described in U.S. Pat. No. 5,043,885 to J. Robinson, "Data Cache Using Dynamic Frequency Based Replacement and Boundary Criteria", Aug. 27, 1991, incorporated herein by reference. In this case non-LRU choices are made using reference counts maintained in specific ways. None of these previous methods refers to or makes use of multiple resolution versions of a single object. These also include for example, the methods described in papers by Abrams et al, "Caching Proxies: Limitations and Potentials", presented at the Fourth International World Wide Web Conference, Boston, 1995; Williams et al, "Removal Policies in Network Caches for World Wide Web Documents", in the Proceedings of the ACM SIGCOMM, 1996, pages 293–304; and Aggarwal et al, "On Caching Policies for Web Objects", IBM Research Report 20619, November 1996 (revised March 1997). All these papers are incorporated herein by reference in their entirety. In terms of any method for finding objects to replace, that method is herein considered to be an alternative and/or modification of step 540. That method being used instead of replacing the least-recently-used object described above. Thus in these other methods instead of replacing the least-recently-used object, one or more other objects are found to be replaceable. Examples include the FBR (frequency based replacement) method, the LRU-MIN, SIZE method, and the PSS method. The present invention is used with any method that finds an object to replace. When using the FBR method, one could increment the reference count. Other options include the insertion of the reduced resolution object in the MIDDLE of the LRU chain, for example. In general, one aspect of the present invention is to increase the "priority" of the reduced resolution object so that it is not immediately eligible for replacement. In some cases, the size of the object may be used as a factor in the choice of objects to replace. Indeed, these alterative methods of finding objects to replace can be incorporated into an embodiment of the current invention in straightforward ways.

An example of a cache directory entry (CDE) as used in an embodiment of the current invention is shown in FIG. 6. An extended CDE is shown with three resolution levels. It should be recognized that it is straightforward to extend this design to a different number of resolution levels. The first part of this extended CDE is identical to the example of a CDE shown in FIG. 4. The extended CDE of FIG. 6 contains a network object name field 610, a type field 620, pointers to the CDEs for the next more-recently-used and next less-recently-used objects 630, and pointers to the previous and next CDEs in the hash chain 640. Three fields 650, 660, 670 give the location, the size of the full resolution version of the object, and the reduced resolution versions of the object in the cache. Any of these fields may be null, indicating that a version of the object at the given resolution is not currently in the cache. However, all fields cannot be simultaneously null. Simultaneous nulls indicate that there is no version of the object in the cache. In such a case the CDE is removed from the cache directory. In more detail, field 650 gives the location and size of the full resolution version of the object. This is called herein resolution 'level-0'. Field 660 gives the location and size of a reduced resolution version of the object, obtained by applying a resolution reducing procedure associated with the type of the object once. It is called herein resolution 'level-1'. Field 670 gives the location and size of a further reduced resolution version of the object. This is called herein resolution 'level-2'. 'Level-2' is obtained by applying the resolution reducing procedure associated with the type of the object twice against the full resolution version of the object, or equivalently once against the resolution 'level-1' version of the object. An embodiment of the current invention is herein described for two different cases. Case 1 is a case in which one, and only one, version (i.e., resolution level) of the object exists in the cache at a time. Case 2 is the case in which multiple resolution levels of the object can preexist in the cache. Case 1 is typical of a general web cache as is commonly used in the Internet today. The situation addressed by case 2 arises in situations in which a special type of intermediate proxy (see 160 in FIG. 1) is used. This special proxy, referred to as a transcoding proxy, intercepts network objects sent from a server and forms a low resolution version of the object which is then stored, along with the high resolution version, in the proxy cache. In case 2, the low resolution version of the object, as opposed to the high resolution version, is also sent on to the client in order to save communication bandwidth on the proxy to client link. The high resolution version of the object that is stored in the proxy is available upon request if the client (see 100 in FIG. 1) decides it is required.

Figure 6A:
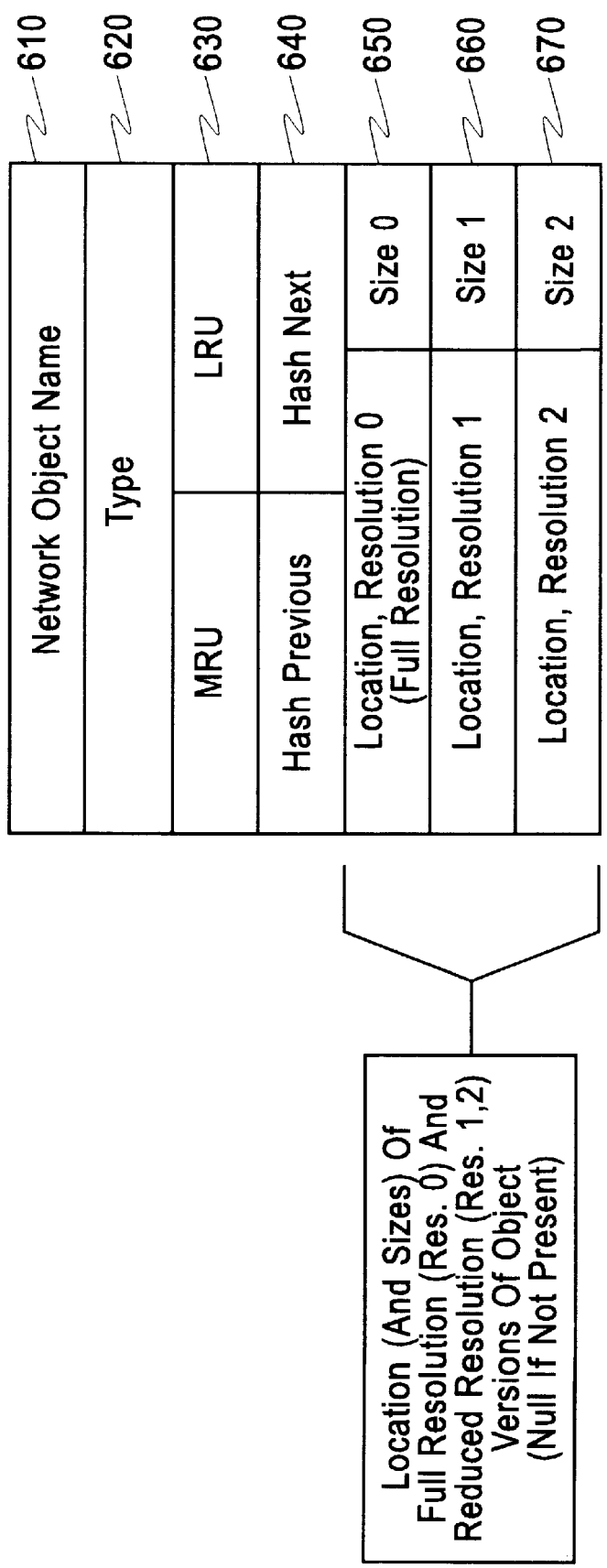
FIG. 6A is a detailed diagram of an example entry in the cache directory of FIG. 3 for the case of a multiresolution network object in accordance with the present invention.
Figure 6B:
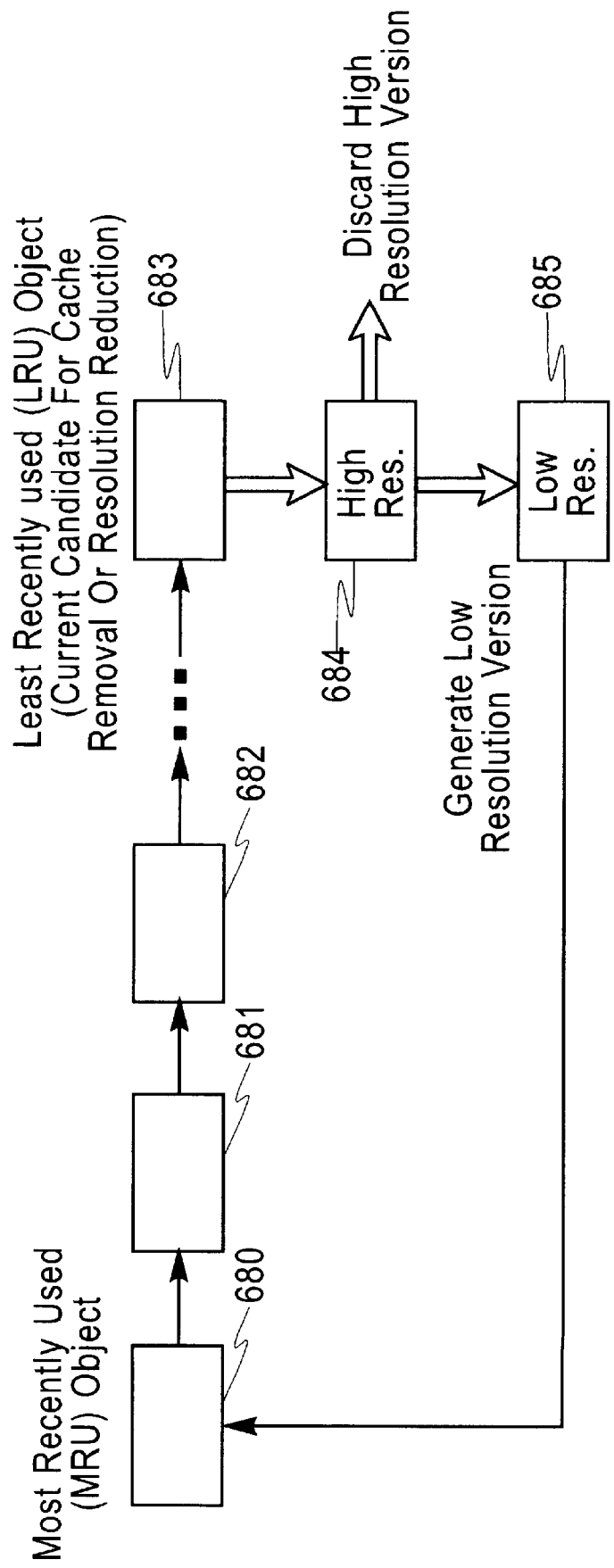
FIG. 6B is a high-level diagram showing an example of a method for reducing multiresolution objects, in a network cache in order to create space to store a new network object in accordance with the present invention, for the case of having only one resolution version of an object stored in the cache at a time.

FIG. 6B shows an embodiment of the present invention for a case 1 situation. It shows a method for managing, adding, removing or reducing, objects in a network object cache in order to create space to store a new network object that is not currently in the cache. Items 680, 681, 682, and 683 are cache directory entries, which have pointers to network objects as shown in FIG. 6A. These CDEs are stored in a linked list beginning with the most-recently-used and ending with the least-recently-used object. We will refer to this linked list as the LRU chain. In the situation shown in FIG. 6B, when it is determined that additional space is needed in the cache to store a new object, the least-recently-used object is examined. This least-recently-used object is pointed to by CDE 683. If this LRU object is not of a multiresolution type then it will be removed to make additional space in the cache. If the object 684 is of a multi-resolution type then a lower resolution version 685 will be generated and a CDE pointing to this lower resolution version will be inserted at the beginning of the aforementioned LRU chain. The high resolution version of the object will be discarded to make additional space in the cache. In this way, for case 1, a network object can be dynamically reduced in size to clear space in the cache for new objects.

Figure 6C:
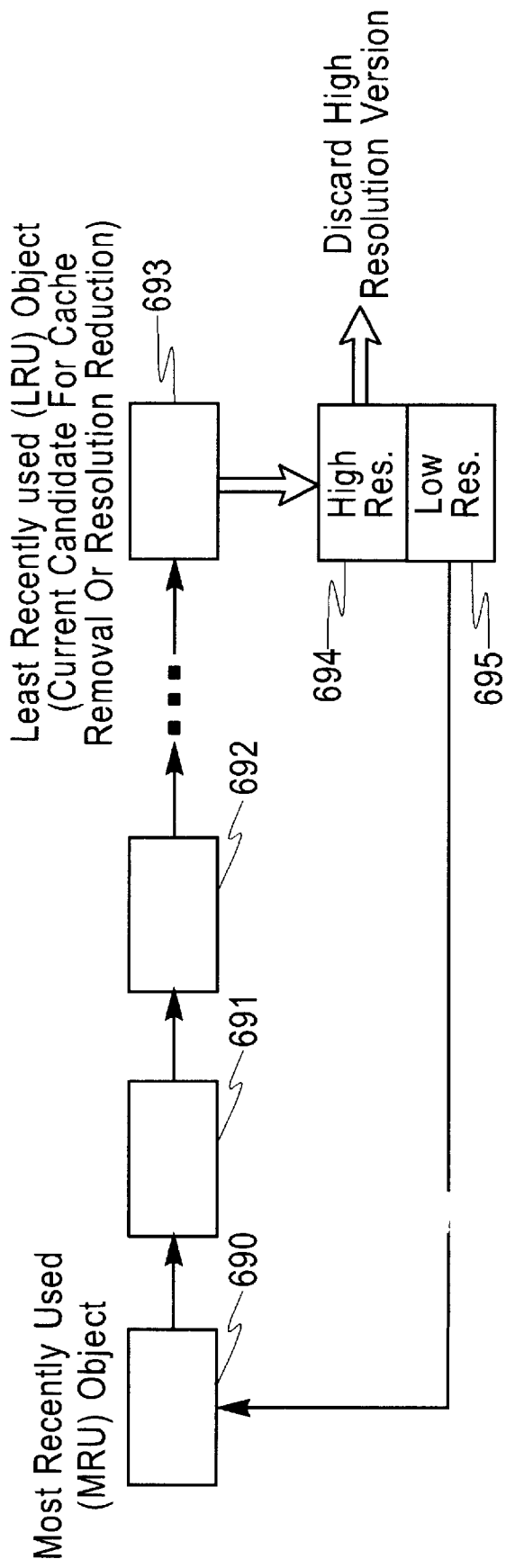
FIG. 6C is a high-level diagram showing an example of a method for reducing multiresolution objects, in a network cache in order to create space to store a new network object in accordance with the present invention, for the case of having multiple resolution versions of an object stored in the cache at a time.

A method for removing or reducing objects in a network object cache in order to create space to store a new network object that is not currently in the cache is shown in FIG. 6C. FIG. 6C shows an embodiment of the present invention for case 2 described above. Items 690, 691, 692, and 693 are cache directory entries that form the LRU chain as shown in FIG. 6B.

FIG. 6C shows the steps for a situation in which it is determined that additional space is needed in the cache to store a new object. The least-recently-used object, which is pointed to by CDE 693, is examined. If this LRU object is not of a multiresolution type then it will be removed to make additional space in the cache. If the object 694 is of a multiresolution type then, since multiple resolution versions may exist for this situation of case 2, the highest existing resolution version 694 is discarded and the CDE for the network object is then inserted at the beginning of the aforementioned LRU chain. In this way, for case 2, the largest of multiple resolution versions of a network object is discarded to clear space in the cache for new objects.

Figure 7A:
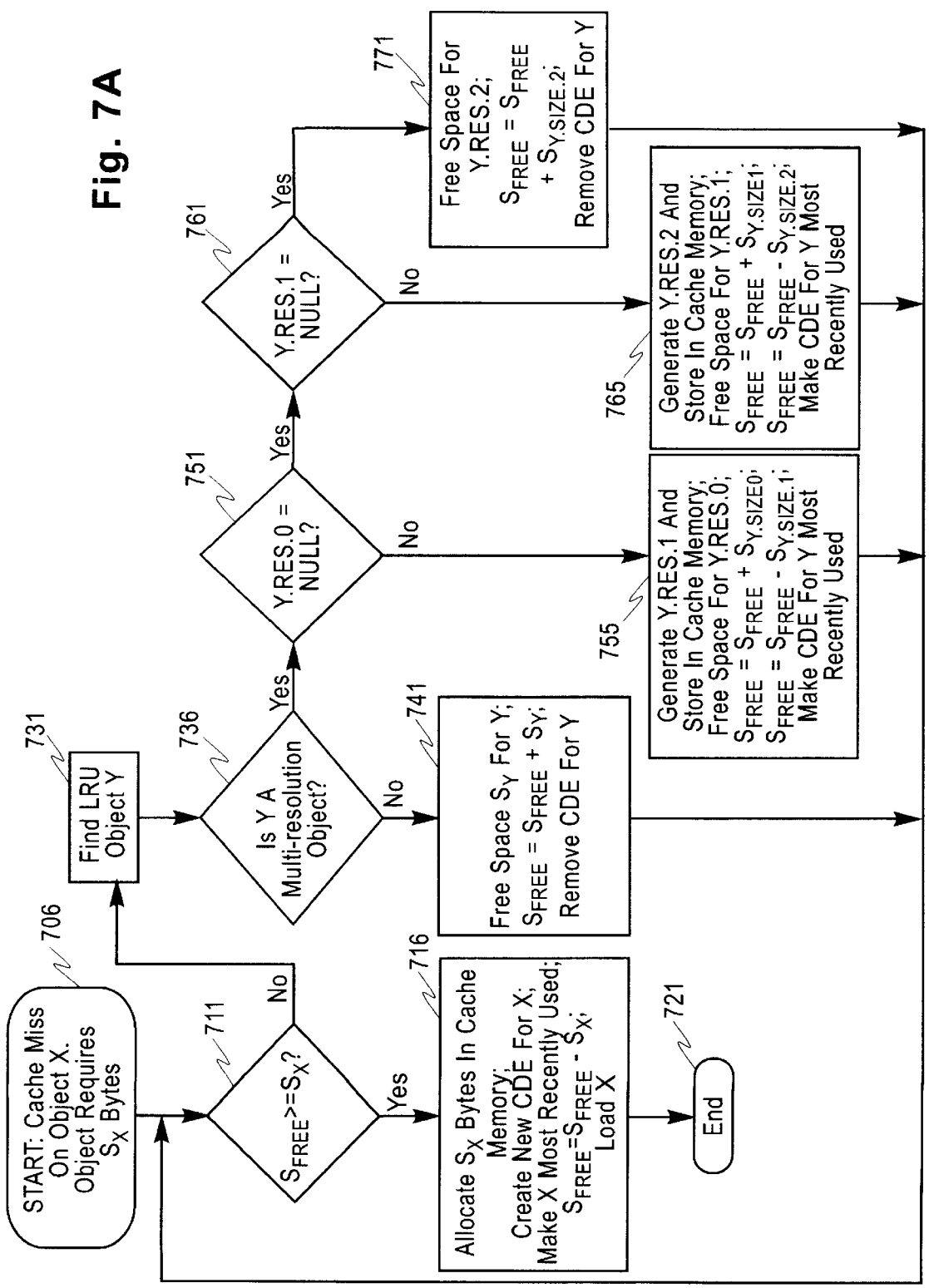
FIG. 7A is a flow chart showing an example of a method for removing non-multiresolution objects and for reducing or removing multiresolution objects, in a network cache in order to create space to store a new network object, for a case in which one and only one version of the object exists in the cache at a time, in accordance with the present invention.
Figure 7B:
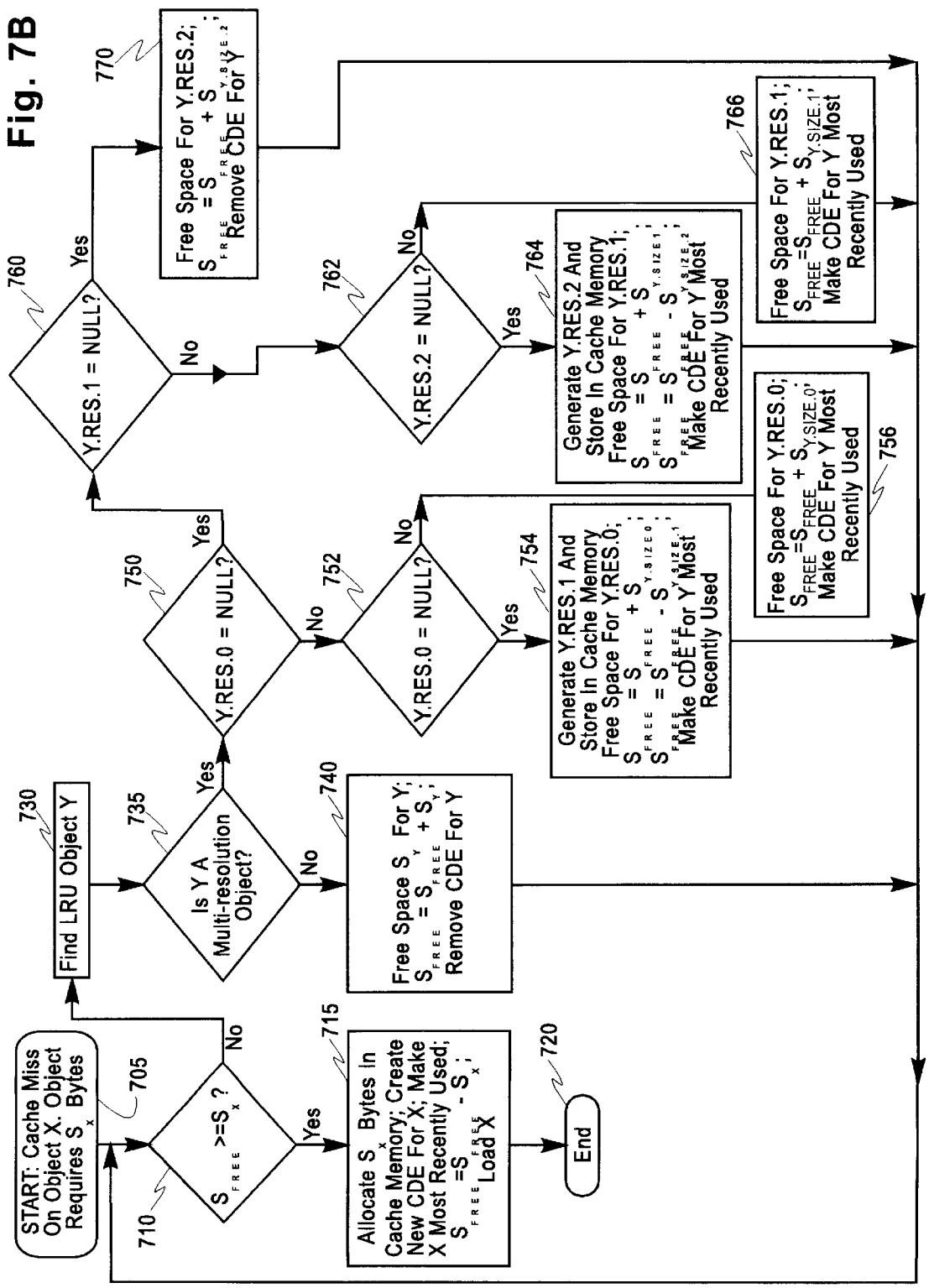
FIG. 7B is a flow chart showing an example of a method for removing non-multiresolution objects and for reducing or removing multiresolution objects, in a network cache in order to create space to store a new network object, for a case in which multiple resolution levels of the object can preexist in the cache, in accordance with the present invention.

Having described, in a high level way, the methods of an embodiment of the present invention, two detailed flow charts corresponding to cases 1 and 2 are shown in FIG. 7A and FIG. 7B. A method for removing and reducing objects in a network object cache in order to create space to store a new network object that is not currently in the cache in an embodiment of the present invention is shown in FIG. 7A.

A method for removing or reducing objects in a network object cache, for a case 1 situation, in an embodiment of the present invention is shown in FIG. 7A. Steps 706, 711, 716 and 721 correspond to the method previously illustrated in FIG. 5. In step 706, it is determined that object 'x' is not in the cache, and requires 'Sx' bytes of storage. In step 711 a check is performed to determine if the current free space in the cache, denoted by 'S_FREE', is greater than or equal to 'Sx'. If it is greater, control proceeds to step 716. In step 716 'x' is stored in the cache and 'Sx' bytes of cache memory are allocated. A CDE for 'x' is created linking the CDE in the hash chain. The CDE is set to be the most-recently-used and 'S_FREE' is set to 'S_FREE'–'Sx'. Object 'x' is loaded into the cache in the newly allocated memory area or areas. The method then terminates in step 721. If however, in step 711 it was determined that there was insufficient free cache memory, control proceeds to step 731. In step 731 the least-recently-used object 'y' is found, or alternatively some other object candidate for replacement is found, as previously described. At this point, unlike previous methods, a check is performed in step 736 to determine if 'y' is a multiresolution object as in the following. The system maintains a list of network object 'types' for which resolution reducing procedures are available. It is noted, that as shown in FIG. 2, these resolution reducing procedures can be implement in hardware or software. If the 'type' of 'y' is in this list, the test in step 736 succeeds, indicating that 'y' is a multiresolution object. Otherwise, 'y' is handled as in step 741. The space allocated to 'y' consisting of 'Sy' bytes is made free and 'S_FREE' is increased to 'S_FREE'+'Sy'. The CDE for 'y' is removed since 'y' is no longer stored in the cache. Next, control returns to step 711, where a check is made to determine if there is sufficient free cache memory to store 'x'.

However, if 'y' was found to be a multiresolution object in step 736, control proceeds to step 751. In step 751, object 'y' is checked to determine if a resolution 'level-0' (full resolution) version of the object exists in the cache. If it does exist, the resolution 'level-0' location field is non-null, and control proceeds to step 755. In step 755, the resolution reducing procedure associated with the 'type' of 'y' is applied to the resolution 'level-0' version of 'y', thereby generating a resolution 'level-1' version of 'y'. The space for 'y'_RES_0 is made free in the cache and the resolution 'level-0' location is set to NULL. The resolution level version 'y'_RES_1 is stored in the cache and the resolution 1 location field in the CDE is set to point to this location. 'S_FREE' is first increased to 'S_FREE'+'Sy'_SIZE_0 since the resolution 'level-0' version was removed. 'S_FREE' is decreased to 'S_FREE'−'Sy'_SIZE$_{13}$ 1' since the resolution 'level-1' version was stored. The CDE for 'y' is set to be the most-recently-used and control returns to step 711.

If in step 751, a resolution 'level-0' version was not found, i.e., the location field was NULL, control proceeds to step 761. In step 761 a check is made to determine whether a resolution 'level-1' version of 'y' resides in the cache. If so, control proceeds to step 765. In step 765 the resolution reducing procedure associated with the 'type' of 'y' is applied to the resolution 'level-1' version of 'y', thereby generating a resolution 'level-2' version of 'y' with a size 'Sy_SIZE_2'. The space for 'y'_RES_1 is made free in the cache and the resolution 'level-1' location is set to NULL. The resolution 'level-2' version 'y'_RES_2 is stored in the cache and the resolution 2 location field in the CDE set to point to this location. First, 'S_FREE' is increased to 'S_FREE'+'Sy'_SIZE_1 and the resolution 'level-1' version is removed. Then, 'S_FREE' is decreased to 'S_FREE'−'Sy'_SIZE_2, since the resolution 'level-2' version was stored. The CDE for 'y' is set to be the most-recently-used, and control returns to step 711.

Returning to step 761, if no resolution 'level-1' version was found in the cache, this shows that there must be a resolution 'level-2' version. This is so since it was previously determined along this control path that there is also no resolution 'level-0' version. As previously described the object must reside in the cache in at least one resolution level in order to have a CDE. In this case control proceeds to step 771. In the embodiment used for illustrative purposes, it is assumed that no resolution level higher than 2 is used. Therefore, in step 771, since the only version of the object in the cache is at resolution 'level-2', no further reduction in resolution is allowed, and the object is removed from the cache. The space for the resolution 'level-2' version of 'y', with a size of 'Sy_SIZE_2', is made free, and 'S_FREE' is increased to 'S_FREE'+'Sy'_SIZE_2. The CDE for 'y' is removed from the cache directory, and control returns to step 711. Note that it is straightforward to extend this design so that the maximum resolution level is not fixed for all objects. For example, the maximum resolution level could depend on the 'type' of object, the size of an object of that 'type', with increased levels of resolution allowed for increasing object sizes.

In the above method, as described in steps 755 and 765, the cache directory entry (CDE) of the resolution reduced object was made to be the most-recently-used object. Alternative methods may be used for reintegrating the resolution reduced object back into the linked-list of CDEs. For example, in one such alternative the resolution reduced object is reinserted in the middle of the linked-list of CDES. Another alternative is to employ the reference count based method described in U.S. Pat. No. 5,043,885 to J. Robinson et al., for example, by maintaining the linked-list position, but increasing the reference count. All of these alternatives have the effect of increasing the priority of the resolution reduced object so that it is not immediately selected for replacement or further reduction.

A method for removing or reducing objects in a network object cache, for a case 2 situation, in an embodiment of the present invention is shown in FIG. 7B. Steps 705, 710, 715 and 720 correspond to the method previously illustrated in FIG. 5. In step 705, it is determined that object 'x' is not in the cache, and requires 'Sx' bytes of storage. In step 710 a check is performed to determine if the current free space in the cache, denoted by 'S_FREE', is greater than or equal to 'Sx'. If it is greater, control proceeds to step 715. In step 715 'x' is stored in the cache and 'Sx' bytes of cache memory are allocated. A CDE for 'x' is created linking the CDE in the hash chain. The CDE is set to be the most-recently-used and 'S_FREE' is set to 'S_FREE'−'Sx'. Object 'x' is loaded into the cache in the newly allocated memory area or areas. The method then terminates in step 720. If however, in step 710 it was determined that there was insufficient free cache memory, control proceeds to step 730. In step 730 the least-recently-used object 'y' is found (or alternatively some other object candidate for replacement is found, as previously described. At this point, unlike previous methods, a check is performed in step 735 to determine if 'y' is a multiresolution object as in the following. The system maintains a list of network object 'types' for which resolution reducing procedures are available. It is noted, that as shown in FIG. 2, these resolution reducing procedures can be implement in hardware or software. If the 'type' of 'y' is in this list, the test in step 735 succeeds, indicating that 'y' is a multiresolution object. Otherwise, 'y' is handled as in step 740. The space allocated to 'y' consisting of 'Sy' bytes is made free and 'S_FREE' is increased to 'S_FREE'+'Sy'. The CDE for 'y' is removed since 'y' is no longer stored in the cache. Next, control returns to step 710, where a check is made to determine if there is sufficient free cache memory to store 'x'.

However, if 'y' was found to be a multiresolution object in step 735, control proceeds to step 750. In step 750, object 'y' is checked to determine if a resolution 'level-0' (full resolution) version of the object exists in the cache. If it does exist, the resolution 'level-0' location field is non-null, and control proceeds to step 752. In step 752, a check is performed to determine if a resolution 'level-1' version of 'y' exists in the cache. If it does exist, control proceeds to step 756. In step 756, the space for the resolution 'level-0' version is freed and the location in the CDE for 'y' for the resolution 'level-0' version is set to NULL. 'S_FREE' is increased to 'S_FREE'+'Sy'_size_0, the CDE for 'y' is set to be the most-recently-used, and control returns to step 710.

If in step 752 a resolution 1 version was not found, control proceeds to step 754. In step 754 the resolution reducing procedure associated with the 'type' of 'y' is applied to the resolution 'level-0' version of 'y', thereby generating a resolution 'level-1' version of 'y'. The space for 'y'_RES_0 is made free in the cache and the resolution 'level-0' location is set to NULL. The resolution level version 'y'_RES_1 is stored in the cache and the resolution 1 location field in the CDE is set to point to this location. 'S_FREE' is first increased to 'S_FREE'+'Sy'_SIZE_0 since the resolution 'level-0' version was removed. 'S_FREE' is decreased to 'S_FREE'−'Sy'_SIZE_1' since the resolution 'level-1' version was stored. The CDE for 'y' is set to be the most-recently-used and control returns to step 710.

If in step 750, a resolution 'level-0' version was not found, i.e., the location field was NULL, control proceeds to step 760. In step 760 a check is made to determine whether a resolution 'level-1' version of 'y' resides in the cache. If so, control proceeds to step 762, in which a check is made to determine if a resolution 'level-2' version exists in the cache. If a resolution 'level-2' version also exists, control proceeds to step 766. In step 766 the space for the resolution 'level-1' version is freed and the location in the CDE for 'y' for the resolution 'level-1' version is set to NULL. 'S_FREE' is increased to 'S_FREE'+'Sy'_SIZE_1, the CDE for 'y' is set to be the most-recently-used and control returns to step 710.

If in step 762 a resolution 2 version was not found, control proceeds to step 764. In step 764, the resolution reducing procedure associated with the 'type' of 'y' is applied to the resolution 'level-1' version of 'y', thereby generating a resolution 'level-2' version of 'y' with a size 'Sy SIZE_2'. The space for 'y' RES_1 is made free in the cache and the resolution 'level-1' location is set to NULL. The resolution 'level-2' version 'y'_RES_2 is stored in the cache and the resolution 2 location field in the CDE set to point to this location. First, 'S_FREE' is increased to 'S_FREE'+'Sy'_SIZE_1 and the resolution 'level-1' version is removed. Then, 'S_FREE' is decreased to 'S_FREE'−'Sy'_SIZE_2, since the resolution 'level-2' version was stored. The CDE for 'y' is set to be the most-recently-used, and control returns to step 710.

Returning to step 760, if no resolution 'level-1' version was found in the cache, this shows that there must be a resolution 'level-2' version. This is so since it was previously determined along this control path that there is also no resolution 'level-0' version. As previously described the object must reside in the cache in at least one resolution level in order to have a CDE. In this case control proceeds to step 770. In the embodiment used for illustrative purposes, it is assumed that no resolution level higher than 2 is used. Therefore, in step 770, since the only version of the object in the cache is at resolution 'level-2', no further reduction in resolution is allowed, and the object is removed from the cache. The space for the resolution 'level-2' version of 'y', with a size of 'Sy_SIZE_2', is made free, and 'S_FREE' is increased to 'S_FREE'+'Sy'_SIZE_2. The CDE for 'y' is removed from the cache directory, and control returns to step 710. Note that it is straightforward to extend this design so that the maximum resolution level is not fixed for all objects. For example, the maximum resolution level could depend on the 'type' of object, the size of an object of that 'type', with increased levels of resolution allowed for increasing object sizes.

In the above method, as described in steps 754, 764, 756 and 766, the cache directory entry (CDE) of the resolution reduced object was made to be the most-recently-used object. As was described earlier for FIG. 7A, alternative methods may be used for reintegrating the resolution reduced object back into the linked-list of CDEs.

In determining whether an object is of a multiresolution 'type', a table such as that illustrated by FIG. 8 may be used. In the header of this table 810, the current number of multiresolution 'types' (three for this example), is stored along with other information, depending on implementation details. Then, for each member of the current set of multiresolution 'types', there is an entry in the table. The entry gives the 'type' name and a pointer to a resolution reducing procedure associated with that 'type'. This is illustrated in FIG. 8 by entries 820, 830 and 840. As was shown in FIG. 2, these resolution reducing procedures can be dynamically extended when new resolution reducing procedures become available for 'types' not currently in the table. For example, suppose one 'type' of object is 'UNFORMATTED TEXT', and that this 'type' is not currently a multiresolution 'type'. In some cases it may be acceptable to consider a procedure TRUNC-TEXT that erases the last 90 percent (say) of a text file and retains the first 10 percent as a kind of resolution reduction procedure for unformatted text files. The string MORE could be appended to the end of the reduced file to indicate that the file has been truncated. In such a case the multiresolution-object table of FIG. 8 could be extended to include this 'type' as follows. An entry 'UNFORMATTED-TEXT, TRUNC-TEXT' is appended to the table, and the number of 'types' in the table header 810 is then incremented to four.

A final component mechanism of one embodiment of the present invention is the method through which a client for the proxy computer specifies to another computer (i.e., the proxy or server) a request to send a multiresolution object with a given name, and at a given resolution level. The client browser sends a message (.e.g, an HTTP get request) to the source computer (i.e. the proxy or server) in which the object name (e.g., Y) and the desired object resolution level are requested (e.g., SIZE_1). At the source computer, if the object with the requested resolution level is available, then it is sent to the client. If the object is not available with the requested resolution, then the source computer either generates the requested resolution level, or makes a request to another source, or returns a message indicating the unavailability of the requested object at the requested resolution level.

All the embodiments of the present inventions are also suitable for inclusion in an article of manufacture. The article being used for implementing the present invention in a particular system. For example, the article may be a floppy disk or a CDROM loaded to enable the system to perform an embodiment of the invention.

In another embodiment, a method for removing or reducing objects in an object cache includes: creating an amount of space to store a new object that is not currently in the cache; selecting a particular object in the cache for replacement by locating a multiresolution type object; discarding the highest resolution version of the multiresolution type object; retaining a next lowest resolution version of the object if it exists; increasing the priority of the next lowest resolution version of the multiresolution object; and preventing the multiresolution object from becoming immediately eligible for subsequent replacement. Many methods for increasing the priority of an object are known to those skilled in the art. Examples include the FBR (frequency based replacement) method, which uses frequency of usage as the criterion for increasing the priority of an object. In addition, methods for increasing priority can also be based on the criteria used in the LRU-MIN, SIZE and PSS methods.

It is noted that although the description of the invention is made for particular arrangements of steps, the intent and concept of the present invention are suitable and applicable to other arrangements. Thus, for example, the article of manufacture may include particular objects which have a first resolution of data, further causing the computer to effect the determining when the first resolution of data of one of the objects is deleted in accordance with a first resolution deletion policy., and/or wherein each of the objects has a low resolution of data further causing the computer to effect an action for determining when the low resolution of data of one of said objects is deleted in accordance with a low resolution deletion policy. The use of the CDE and linked-list described is just one way of employing a list known to those familiar with the art. Thus any ordered list may be used. In particular, the reference to a cache serves only as a convenient example for implementing the concepts of the invention. The invention is likewise meant to include the provision of space conservation and/or memory saving methods, apparatus or article of manufacture for any type of storage unit. It will be clear to those skilled in the art that other modifications to the disclosed embodiments can be effected without departing from the spirit and scope of the invention.

We claim:

1. A method for conserving an amount of storage space in a unit that stores a plurality of objects in a memory, the method comprising:

having a first resolution version of one of the objects in the memory;

generating at least one lower resolution version of said one of the objects, the lower resolution version using less memory space than the first resolution version;

saving the lower resolution version in the memory; and discarding the first resolution version from the memory.

2. A method for managing a plurality of objects in a cache, the method comprising:

creating a cache directory having cache directory entries for any non-multiresolution objects that may exist and for the at least one multiresolution object, each cache directory entry of a multiresolution object having pointers to all existing resolution versions of that object; and forming an ordered list of the entries.

3. A method as recited in claim 2, wherein the step of forming is based on a last usage time at which a particular object was used.

4. A method as recited in claim 2, wherein the ordered-list is formed according to a frequency of object usage criterion.

5. A method as recited in claim 2, further comprising:

storing each object in a current resolution version, ascertaining if a cache directory entry corresponding to a lowest priority object y in the ordered list is a multiresolution object, and if object y is a multiresolution object, generating and storing a reduced resolution version of object y, removing the current resolution version of object y to create an amount of free space in the cache, setting the cache directory entry for object y to be a highest priority object, and determining if the amount of free space is sufficient for storing an object x, if the amount of free space is not sufficient for storing object x, repeating the steps of ascertaining, generating, removing, setting and determining for a next lowest priority object in the ordered list of cache directory entries, until the amount of free space is sufficient for storing object x, and storing object x within the free space.

6. A method as recited in claim 5, further comprising:

if y is not a multiresolution object, removing object y from the cache to increase the amount of free space, and determining if the amount of free space is sufficient for storing object x, if the amount of free space is not sufficient for storing object x, repeating the steps of ascertaining, generating, removing, setting and determining for a next lowest priority object in the ordered list of cache directory entries until the amount of free space is sufficient for storing object x, and storing object x within the free space.

7. A method as recited in claim 2, further comprising:

storing each object in a current resolution version, ascertaining if a first cache directory entry corresponding to a least-recently-used object y at an end of the ordered list is a multiresolution object, and if object y is a multiresolution object, generating and storing a reduced resolution version of object y, removing a current high resolution version of object y, so as to create an amount of free space, setting the first cache directory entry for object y to be a most-recently-used object by placing the first cache directory entry at a beginning of the ordered list, and determining if the amount of free space is sufficient for storing an object x, if not, repeating the steps of ascertaining, generating, removing, setting and determining for a next least-recently-used object in the ordered list of cache directory entries, until the amount of free space is sufficient for storing object x, and storing object x within the free space.

8. A method as recited in claim 7, further comprising:

if y is not a multiresolution object, removing object y from the cache to increase the amount of free space, and determining if the free space is sufficient for storing object x, if the amount of free space is not sufficient, repeating the steps of ascertaining, generating, removing, setting and determining for a next least-recently-used object in the ordered list of cache directory entries until the amount of free space is sufficient for storing object x, and storing object x within the free space.

9. A method as recited in claim 2, wherein said managing includes reducing an object resolution of at least one of the multiresolution objects.

10. A method for managing objects in an object cache, the method comprising:

creating an amount of space to store a new object that is not currently in the cache, selecting a particular object in the cache for replacement by locating a multiresolution object, and discarding a highest resolution version of the multiresolution object, retaining a next lowest resolution version of the object if it exists, increasing a priority of a next lowest resolution version of the multiresolution object, and preventing the multiresolution object from becoming immediately eligible for subsequent replacement.

11. A method as recited in claim 10, wherein the step of increasing includes forming an ordered list based on a last usage time at which a particular object was used.

12. In a system that stores a plurality of objects in a cache, a method for determining whether an object is of a multi-resolution type, the method comprising:

creating a table listing the currently understood multi-resolution types in the system and the procedures for generating a reduced resolution version for each object type, searching for a match between the type of an object and one of a plurality of types listed in the table, and if a match is not found, indicating that the object is not a multiresolution object, if a match is found, indicating both that the object is a multiresolution object, and that a resolution reduction procedure listed in the table is useful to generate a lower resolution version of the object.

13. A method for managing objects in an object cache in order to create an amount of free space to store a new object x that is not currently in the cache, the method comprising:

storing each multiresolution object in a plurality of resolution versions, wherein an amount of cache space taken up by a low resolution version is less than the amount of space taken up by a higher resolution version, creating a cache directory having entries for any non-multiresolution objects that may exist and for the at least one multiresolution object, each cache directory entry having pointers to all existing resolution versions of the at least one multiresolution object; and forming an ordered-list of the entries, wherein the ordering criterion is based on a last usage time at which a particular object was used, determining if the cache directory entry corresponding to a least-recently-used object y at the end of the ordered list is a multiresolution object, and if y is not a multiresolution object, removing object y and ascertaining if an amount of newly increased free space is sufficient for storing object x, if the amount of newly increased free space is not sufficient for storing object x, repeating the steps of determining and ascertaining for a next least-recently-used object in the ordered list of cache directory entries, until the amount of free space is sufficient for storing object x, and storing object x within the free space, if y is a multiresolution object, determining if more than one resolution version of the object is currently stored, and if only one resolution version is currently stored, generating and storing a reduced resolution version of object y, removing the current high resolution version of object y, setting the cache directory entry for object y to be a most-recently-used object by placing the cache directory entry at the beginning of the ordered list, and ascertaining if the newly increased free space is sufficient for storing said object x, if the amount of newly increased free space is not sufficient for storing object x, repeating the steps of determining and ascertaining for the next least-recently-used object in the ordered list of cache directory entries, until the amount of free space is sufficient for storing object x, and storing object x within the free space, if more than one resolution version is currently stored, removing the current high resolution version of object y, setting the cache directory entry for object y to be the most-recently-used object by placing the cache directory entry at the beginning of the ordered list, and ascertaining if the newly increased free space is sufficient for storing object x, if not, repeating the steps of removing, setting and ascertaining for the next highest resolution version of object y in the ordered list of cache directory entries, until the amount of free space is sufficient for storing object x, and storing object x within the free space.

14. A method for determining whether an object is a multiresolution type in a system that stores a plurality of objects in a cache, comprising:

creating a table that lists the currently understood multi-resolution types in the system, searching for a match between the type of an object and the types listed in the table, and if a match is not found, indicating that the object is not a multiresolution object, if a match is found, indicating that the object is a multiresolution object.

15. A method as in claim 14, wherein the table lists the procedures for generating a reduced resolution version for each object type, the method further comprising:

if said match is found, indicating, from information in said table, that a particular resolution reduction procedure is to be used to generate a lower resolution version of the object.

16. A method for modifying objects in a network object cache, said method comprising:

determining the cache size 'Sx' bytes of storage required by an object 'x' not currently in the cache;

determining if an amount of current free space 'S_FREE' in the cache is greater than or equal to 'Sx'; and if 'S_FREE' is greater than 'Sx', said method further comprising:

allocating Sx' bytes of cache memory to 'x' and storing 'x' in the allocated cache;

creating a CDE for 'x' and ordering the CDE in a hash chain;

setting the CDE to be a present most-recently-used object; and in setting 'S_FREE' to 'S_FREE'−'Sx'.

17. A method as recited in claim 16, when 'Sx' is greater than 'S_FREE', said method further comprising;

finding a previous least-recently-used object 'y';

ascertaining if object 'y' is a multiresolution object, if object 'y' is not a multiresolution object:

removing an 'y' CDE and freeing an amount of cache space allocated to object 'y' consisting of 'Sy' bytes to form 'S_FREE_NEW'='S_FREE'+'Sy', and determining if 'S_FREE_NEW' is greater than 'Sx', if yes, storing 'x', if not, repeating said step of ascertaining for a next least-recently-used object 'y'.

18. A method as recited in claim 17, wherein object 'y' is a multiresolution object, said method further comprising:

determining if object 'y' exists in a resolution 'level-0' version in the cache, if it does exist, nulling the resolution 'level-0' location field and forming 'S_FREE_NEW'='S_FREE'+'Sy', and determining if 'S_FREE_NEW' is greater than 'Sx', if yes, storing 'x', if not, repeating said step of ascertaining for a next least-recently-used object 'y'.

19. A method as recited in claim 17, wherein object 'y' is a particular multiresolution object, said method further comprising:

determining if a resolution 'level-1' version of object 'y' exists in the cache, if it does exist, freeing a level-1 space for the resolution 'level-0' version, nulling the CDE for object 'y' for the resolution 'level-0' version, increasing 'S_FREE' to 'S_FREE'_NEW2='S_FREE'+'Sy'_SIZE_0; setting a CDE for object 'y' to be a most-recently-used object, and determining if 'S_FREE_NEW2' is greater than 'Sx', if yes, storing 'x', if not, repeating said step of ascertaining for a next least-recently-used object 'y'.

20. A method as recited in claim 19, wherein a resolution 1 version was not found, said method further comprising:

applying a resolution reducing procedure associated with a 'type' associated with object 'y' to the resolution 'level-0' version of object 'y', thereby generating a resolution 'level-1' version of object 'y';

freeing an amount of space equal to 'y'_RES_0 in the cache, and nulling the resolution 'level-0' location;

storing object 'y' in a resolution level version 'y'_RES_1 in the cache;

setting a resolution 1 location field in the CDE to point to said level-0 location;

increasing 'S_FREE' to 'S_FREE' plus 'Sy'_SIZE_0;

decreasing 'S_FREE' to 'S_FREE' minus 'Sy'_SIZE_1; and setting a 'y'_CDE for object 'y' to be the most-recently-used.

21. An article of manufacture comprising:

a computer usable medium having computer readable program code means embodied therein for conserving an amount of cache space in a system that stores a plurality of objects in a cache, the computer readable program code means in said article of manufacture comprising:

computer readable program code means for causing a computer to effect:

generating at least one small size lower resolution version of at least one of the objects;

saving the lower resolution version in the cache; and discarding a large size higher resolution version of said at least one of the objects.

22. An article as recited in claim 21, wherein each of the objects has a first resolution of data, further causing the computer to effect, determining when the first resolution of data of one of the objects is deleted in accordance with a first resolution deletion policy.

23. An article as recited in claim 21, wherein each of said objects has a low resolution of data, further causing the computer to effect an action for determining when said low resolution of data of one of said objects is deleted in accordance with a low resolution deletion policy.

24. A program storage device readable by machine, tangibly embodying a program of instructions executable by the machine to perform method steps for conserving the effective cache space in a system that stores a plurality of objects in a cache, said method step comprising generating at least one small size lower resolution version of at least one of the objects;

saving the lower resolution version in the cache; and discarding a large size higher resolution version of said at least one of the objects.

25. A device as recited in claim 24, wherein each of the objects has a first resolution of data taking up a first amount of cache, the method further comprising:

determining when the first resolution of data of one of said objects is deleted in accordance with a first resolution deletion policy to increase an amount of cache free space to make room for another object not in the cache.

26. A device as recited in claim 24, wherein each of said objects has a small size low resolution of data, said method further comprising determining when the small size low resolution of data of one of the objects is deleted in accordance with a low resolution deletion policy.

27. A method as recited in claim 2, used in order to create space to store a new object x not currently in the cache, wherein each multiresolution object may initially be stored in a plurality of resolution versions, the method comprising:

determining if a particular cache directory entry corresponding to a lowest priority object y at the end of the ordered list is a multiresolution object, if y is a multiresolution object, ascertaining if more than one resolution version of object y is currently stored, and if more than one resolution version of object y is currently stored, removing a current highest resolution version of said object y to form an amount of free space, setting the cache directory entry for object y to be a highest priority object by placing the cache directory entry for object y at the beginning of the ordered list, and calculating if the amount of free space is sufficient for storing said object x, if not, repeating the steps of determining, ascertaining, removing, setting and calculating for a next lowest priority object in the ordered-list, until the amount of free space is sufficient for storing object x, and storing object x within the free space.

28. A method as recited in claim 27, further comprising:

if only one resolution version of object y is currently stored, generating and storing a reduced resolution version of object y, removing the current high resolution version of object y to increase the amount of free space, setting the cache directory entry for object y to be the highest priority object by placing the cache directory entry at the beginning of the ordered list, and calculating if the newly increased free space is sufficient for storing said object x, if not, repeating the steps of determining, ascertaining, generating, removing, setting, placing and calculating for the next lowest priority object in the ordered list of cache directory entries, until the amount of free space is sufficient for storing object x, and storing object x within the free space, if y is not a multiresolution object, removing said object y and calculating if the newly increased amount of free space is sufficient for storing said object x, if not, repeating the steps of determining, ascertaining, generating, removing, and calculating for the next lowest priority used object in the ordered-list.

29. A method for conserving an amount of cache space in a system that stores a plurality of objects in a cache, the method comprising:

generating at least one small memory size version of at least one of the objects, the small size version taking up a first amount of cache space;

saving the smaller memory size version in the cache; and discarding a high memory size version of said at least one of the objects, the high memory size version taking up a second amount of cache space which is greater than the first amount of cache space.

30. A method for managing a plurality of objects in a cache, the method comprising:

creating a cache directory having entries for any non-multiresolution objects that may exist and for at least one multiresolution object, each cache directory entry having pointers to all existing resolution versions of the at least one multiresolution object; and forming an ordered-list of the entries.

31. A method as recited in claim 30, wherein the ordered-list is formed according to an ordering criterion.

32. A method as recited in claim 31, wherein the ordering criterion is based on a last usage time at which a particular object was used.

33. A method as recited in claim 32, used in order to create space to store a new object x not currently in the cache, wherein each multiresolution object may initially be stored in a plurality of resolution versions each using a different amount of cache space, the method comprising:

determining if a particular cache directory entry corresponding to a least-recently-used object y at the end of the ordered list is a multiresolution object, if y is a multiresolution object, ascertaining if more than one resolution version of the object is currently stored, and if more than one resolution version is currently stored,
removing the current highest resolution version of said object y,
setting the cache directory entry for object y to be the most-recently-used object by placing the cache directory entry at the beginning of the ordered list, and
calculating if an amount of newly increased free space is sufficient for storing said object x, if not, repeating the steps of determining, ascertaining, removing, setting and calculating for the next least-recently-used object in the ordered-list, until the amount of free space is sufficient for storing object x, and storing object x within the free space.

34. A method as recited in claim 33, further comprising:
if only one resolution version is currently stored,
generating and storing a reduced resolution version of object y,
removing the current high resolution version of said object y,
setting the cache directory entry for object y to be the most-recently-used object by placing the cache directory entry at the beginning of the ordered list, and
calculating if the newly increased free space is sufficient for storing said object x,
if not, repeating the steps of determining, ascertaining, generating, removing, setting and calculating for the next least-recently-used object in the ordered list of cache directory entries, until the amount of free space is sufficient for storing object x, and storing object x within the free space,
if y is not a multiresolution object,
removing said object y and calculating if the newly increased free space is sufficient for storing said object x, if not, repeating the steps of determining, ascertaining, generating, removing, setting and calculating for the next least-recently used object in the ordered-list, until the amount of free space is sufficient for storing object x, and storing object x within the free space.

35. An apparatus comprising: a cache, a cache manager which includes a cache space conserver to conserve an amount of cache space used to store a plurality of objects in the cache.

36. An apparatus as recite in claim 35, further comprising a CPU, a network object reducer, and a memory disk.

37. An apparatus as recited in claim 35, wherein the cache further comprises a cache directory.

38. A method as recited in claim 1, further comprising the step of forming an ordered-list of objects in accordance to a priority assigned to each of the objects.

39. A method as recited in claim 38, wherein the priority assigned is based upon a frequency of object usage.

40. A method as recited in claim 1, further comprising:

storing each object in a current resolution version, ascertaining if a lowest priority object y is a multiresolution object, and if object y is a multiresolution object,
generating and storing a reduced resolution version of object y,
removing the current resolution version of object y to create an amount of free space in the memory,
setting a priority for object y to be a highest priority, and
determining if the amount of free space is sufficient for storing object x,
if the amount of free space is not sufficient for storing object x, repeating the steps of ascertaining, generating, removing, setting and determining for a next lowest priority object in the memory, until the amount of free space is sufficient for storing object x, and storing object x within the free space.

41. A method as recited in claim 40, further comprising:
if y is not a multiresolution object,
removing object y from the memory to increase the amount of free space, and
determining if the amount of free space is sufficient for storing object x,
if the amount of free space is not sufficient for storing object x, repeating the steps of ascertaining, generating, removing, setting and determining for a next lowest priority object in the memory until the amount of free space is sufficient for storing object x, and storing object x within the free space.

42. A method as recited in claim 40, whereing the step of ascertaining includes forming a memory directory entry of an ordered list of the objects.

43. A method as recited in claim 1, further comprising:

ascertaining if a least-recently-used object is a multiresolution object, and if object y is a multiresolution object,
generating and storing a reduced resolution version of object y,
removing a current high resolution version of object y from the memory so as to create an amount of free space,
setting a priority for object y to be a most-recently-used object, and
determining if the amount of free space is sufficient for storing object x,
if not, repeating the steps of ascertaining, generating, removing, setting and determining for a next least-recently-used object in the memory, until the amount of free space is sufficient for storing object x, and storing object x within the free space.

44. A method as recited in claim 1, wherein the memory is a temporary buffer.

45. A method as recited in claim 1, wherein the memory is a cache.

* * * * *